United States Patent [19]

Wakino et al.

[11] 4,433,360
[45] Feb. 21, 1984

[54] TUBULAR CERAMIC CAPACITOR

[75] Inventors: Kikuo Wakino; Yoshio Arakawa, both of Nagaokakyo, Japan

[73] Assignee: Murata Manufacturing Co., Ltd., Japan

[21] Appl. No.: 313,963

[22] Filed: Oct. 22, 1981

[30] Foreign Application Priority Data

Oct. 24, 1980 [JP] Japan .......................... 55-152751[U]

[51] Int. Cl.³ ........................ H01G 1/01; H01G 1/153
[52] U.S. Cl. .................................... 361/305; 361/307
[58] Field of Search ...................... 361/307, 303, 305; 29/25.42

[56] References Cited

U.S. PATENT DOCUMENTS 4,319,304 3/1982 Fink .................................... 361/307

FOREIGN PATENT DOCUMENTS 46-10814 3/1971 Japan .
56-87302 7/1981 Japan .

Primary Examiner—B. A. Reynolds
Assistant Examiner—Alfred S. Keve
Attorney, Agent, or Firm—Ostrolenk, Faber, Gerb & Soffen

[57] ABSTRACT

A tubular ceramic capacitor in which a lead terminal for leading out an internal electrode is formed of a Dumet wire, the internal electrode and an external electrode are plated to be formed at the inner and outer surfaces of a tubular ceramic dielectric except for both end faces thereof respectively, the lead terminal of the Dumet wire having a diameter substantially equal to a diameter of an inner bore of the dielectric where the internal electrode is formed and being inserted into the bore substantially throughout the whole length thereof so as to be fixedly soldered, and a metallic cap terminal having an inner diameter substantially equal to an outer diameter of the dielectric and a lead wire projecting from the outer surface of the closed end of the cap terminal, is fitted onto the dielectric in relation of contacting with the external electrode, thereby reducing an amount of solder used for mounting the lead terminal, thus making it possible to prevent the internal electrode from peeling off.

5 Claims, 3 Drawing Figures

TUBULAR CERAMIC CAPACITOR

BACKGROUND OF THE INVENTION

This invention relates to a tubular ceramic capacitor, and more particularly to a tubular ceramic capacitor which uses a dumet wire for a lead terminal leading out an internal electrode of the same.

A conventional tubular ceramic capacitor, as shown in FIG. 1, has an internal electrode 12 and an external electrode 13 plated with nickel or copper and formed at the inner and outer surfaces of a tubular ceramic dielectric 11 except for both open end faces thereof, a lead terminal 14 which is inserted into a bore of dielectric 11. An internal electrode 12 is formed on the dielectric 11 and is conductively fixed to the lead terminal 14 by solder 15. A metallic cap terminal 16 is fitted onto dielectric 11 in conductive contact with external electrode 13 and provides a lead wire 17 at the outer surface of the closed end of terminal 16.

As shown in FIG. 2, this construction requires a large amount of solder 15 for filling a space between the lead terminal 14 and the dielectric 11 because the former has an outer diameter relatively small with respect to the diameter of the bore of dielectric 11.

Since the linear expansion coefficient of solder is greater than the dielectric 11, a problem is raised in that the internal electrode 12 is peeled off from dielectric 11 when solder 15 expands or contracts. Thus, the adhesion strength of the plated internal electrode 12 is not sufficiently great to resist the larger expansive or contraction force of solder 15, and is therefore apt to peel off.

The simplest and most reliable solution to the above problem is to reduce the amount of solder 15 in the bore of dielectric 11 to fix lead terminal 14 to internal electrode 12.

Therefore, a tubular ceramic capacitor has recently been proposed in which the portion of the lead terminal to be inserted into the bore has a larger diameter than the conventional one, the insertion portion being of length throughout the inner bore, thereby reducing the amount of solder 15. The lead terminal 14 used in such capacitor is made of a usual copper or iron wire. The capacitor having the larger diameter lead terminal 14 can reduce the amount of solder 15, thereby preventing the peeling-off of the internal electrode due to expansion or contraction of the solder 15.

The lead terminal 14, however, when using usual iron or copper wire of a larger diameter, becomes larger in its expansion or contraction due to a larger linear expansion coefficient of the wire itself, which acts on internal electrode 12 to lead to the peeling-off thereof.

Another method has been tried for preventing the peeling-off, in which a silver-coated electrode is attached onto the internal electrode to thereby increase the adhesive strength of the plated internal electrode 12. Such method is defective in that the capacitor is difficult to manufacture, very poor in productivity, and expensive to produce.

BRIEF DESCRIPTION OF THE INVENTION

The present invention has been designed to overcome the above problem and relates to a tubular ceramic capacitor in which a lead terminal conductively fixed to an internal electrode is formed of a Dumet wire having an outer diameter and length substantially equal to a diameter and length of an inner bore of a dielectric.

A first object of the invention is to provide a tubular ceramic capacitor which uses a Dumet wire for the lead terminal in conductive connection with the internal electrode by soldering, thereby avoiding peeling-off the internal electrode caused by thermal expansion or contraction of the lead terminal.

A second object of the invention is to provide a tubular ceramic capacitor which is free from peeling-off of the internal electrode and stable in characteristics even over long use.

A third object of the invention is to provide a tubular ceramic capacitor which need not apply any protective film on the internal electrode so as to be simple to manufacture to result in low production cost.

The foregoing and other objects of the present invention are attained by providing a tubular ceramic capacitor comprising:

a tubular ceramic dielectric member having a bore of substantially uniform diameter formed through substantially the entire length thereof;

external and internal electrodes formed on the outer and inner surfaces, respectively, of said dielectric member;

a lead terminal formed of Dumet wire and extending from a position outside said dielectric member into said bore and through substantially the entire length of said bore, the portion of said lead terminal located in said bore being uniform and cylindrical in form and having a diameter substantially equal to the diameter of said bore;

a solder interfacing the outer surface of said internal electrode, said solder serving to both physically and electrically connect said lead terminal to said internal electrode; and a conductive cap terminal having an inner diameter of said dielectric member and being fitted over the outer surface of said dielectric member so as to be in electrical contact with said external electrode, said cap terminal including a lead wire projecting from a closed end of said cap terminal.

BRIEF DESCRIPTION OF THE DRAWINGS

These and other objects of the invention will be more apparent from the following description, reference being had to the accompanying drawings wherein a preferred form of the present invention is clearly shown. In the drawings.

DETAILED DESCRIPTION OF THE INVENTION

Figure 1:
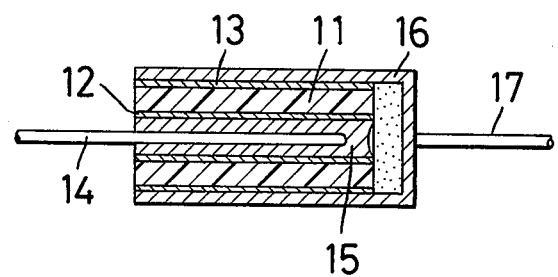
FIG. 1 is a cross-sectional view of a conventional tubular ceramic capacitor.
Figure 2:
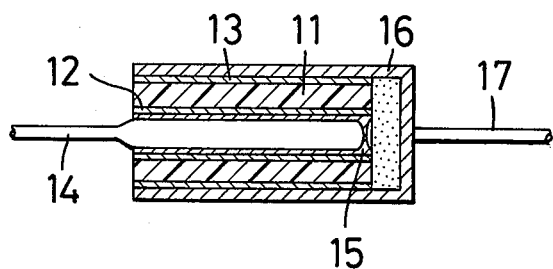
FIG. 2 is a cross-sectional view of a tubular ceramic capacitor of the present invention, which is applied to the conventional capacitor.
Figure 3:
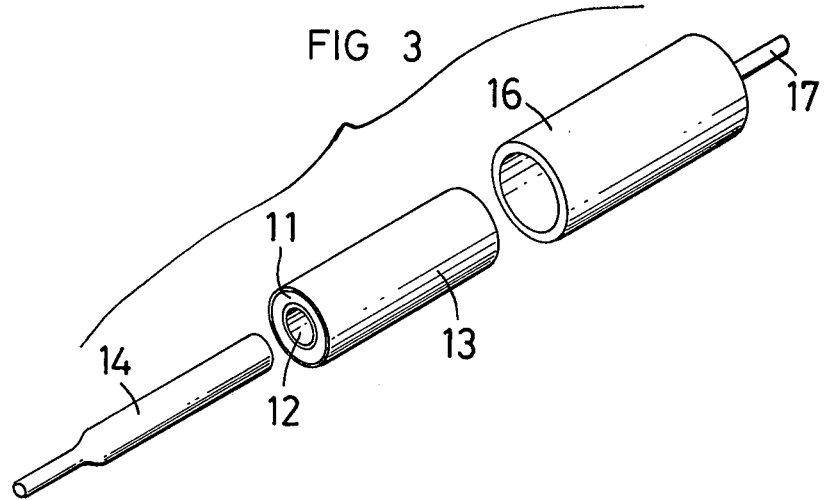
FIG. 3 is a perspective view of the tubular ceramic capacitor in FIG. 2.

An embodiment of the invention is the same as the capacitors shown in FIGS. 1 and 2, whereby the detailed description of concrete construction of the embodiment will be referred to FIGS. 1 and 2 and omitted herewith.

The tubular ceramic capacitor has a lead terminal 14 inserted into a tubular ceramic dielectric 11, fixed conductively to an internal electrode 12 with solder 15, and made from a Dumet wire, the diameter and length of the Dumet wire being substantially equal to those of an inner bore of dielectric 11.

As a result, a small quantity of solder 15 is used for conductively fixing lead terminal 14 to internal electrode 12, and almost no peeling-off occurs even when solder 15 is interposed between the lead terminal 14 and the electrode 12.

The Dumet wire used for lead terminal 14 is of an extremely low linear expansion coefficient of 5 to $11 \times 10^{-6}$, so that its thermal expansion or contraction, even if it occurs, is quantitatively insignificant, thereby avoiding the occurrence of peeling-off at internal electrode 12.

Also, Dumet wire having a linear expansion coefficient smaller than that of ceramic dielectric 11 (usually 8 to $12 \times 10^{-6}$), when in selective use, can effectively prevent the peeling-off at internal electrode 12.

Alternatively, the tubular ceramic dielectric 11 and metallic cap terminal 16 may be of other various shapes, such as round or square.

As seen from the above, the tubular ceramic capacitor uses the dumet wire for the lead terminal constructed as above-mentioned, the dumet wire being equal in diameter to the bore of dielectric and long substantially throughout the bore, thereby considerably reducing an amount of solder in use, keeping low the linear expansion coefficient of lead terminal, and avoiding the peeling-off of internal electrode caused by thermal expansion or contraction of solder and lead terminal, thus stabilizing the characteristics even in long use.

Furthermore, no protective film need be coated on the plated internal electrode 12 which has a small adhesive strength, thereby making the capacitor simple in construction and inexpensive to produce.

While a preferred embodiment of the invention has been described, changes and variations thereto may be made without departing from the spirit or scope of the following claims.

What is claimed is:

1. A tubular ceramic capacitor, comprising:
   a tubular ceramic dielectric member having a bore of substantially uniform diameter formed through substantially the entire length thereof;
   external and internal electrodes formed on the outer and inner surfaces, respectively, of said dielectric member;
   a lead terminal formed of Dumet wire and extending from a position outside said dielectric member into said bore and through substantially the entire length of said bore, the portion of said lead terminal located in said bore using uniform and cylindrical in form and having a diameter substantially equal to the diameter of said bore;
   a solder interfacing the outer surface of said lead terminal and internal electrode, said solder serving to both physically and electrically connect said lead terminal to said internal electrode; and
   a conductive cap terminal having an inner diameter substantially equal to the outer diameter of said dielectric member and being fitted over the outer surface of said dielectric member so as to be in electrical contact with said external electrode, said cap terminal including a lead wire projecting from a closed end of said cap terminal.

2. A tubular ceramic capacitor according to claim 1, wherein said solder interfaces substantially the entire outer surface of the portion of said lead terminal located in said bore and said internal electrode.

3. A tubular ceramic capacitor according to claim 2, wherein said lead terminal extends from a first side of said ceramic member and said lead wire extends from a second opposite side of said ceramic member.

4. A tubular ceramic capacitor according to claim 3, wherein said cap member has a cylindrical portion whose inner diameter is substantially equal to the outer diameter of said ceramic member and which is in electrical and physical contact with said external electrode through the length of said cylindrical portion.

5. A tubular ceramic capacitor according to claim 4, wherein said cylindrical portion extends over substantially the entire outer surface of said ceramic member.

* * * * *